United States Patent
Kuehl et al.

(10) Patent No.: US 6,973,799 B2
(45) Date of Patent: Dec. 13, 2005

(54) DISTRIBUTED REFRIGERATION SYSTEM FOR A VEHICLE

(75) Inventors: Steven J. Kuehl, Stevensville, MI (US); Carolyn L. Slone, St. Joseph, MI (US); Douglas D. LeClear, Coloma, MI (US); Jon D. Tromblee, Coloma, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/647,406

(22) Filed: Aug. 25, 2003

(65) Prior Publication Data

US 2004/0139757 A1    Jul. 22, 2004

Related U.S. Application Data

(60) Provisional application No. 60/319,501, filed on Aug. 27, 2002.

(51) Int. Cl.$^7$ ................................................. B60H 1/32
(52) U.S. Cl. ........................... 62/244; 62/434; 62/457.7
(58) Field of Search .................. 62/239, 244, 430–439, 62/457.1–457.9

(56) References Cited

U.S. PATENT DOCUMENTS

| | | | |
|---|---|---|---|
| 3,850,006 A | 11/1974 | Redfern et al. | 62/216 |
| 4,103,510 A | 8/1978 | Hall | 62/299 |
| 4,637,222 A * | 1/1987 | Fujiwara et al. | 62/244 |
| 5,138,851 A * | 8/1992 | Mardikian | 62/244 |
| 5,168,718 A | 12/1992 | Bergmann | 62/244 |
| 5,265,437 A * | 11/1993 | Saperstein et al. | 62/243 |
| 5,904,052 A * | 5/1999 | Inoue et al. | 62/244 |
| 6,722,147 B2 * | 4/2004 | Heyl et al. | 62/244 |

* cited by examiner

Primary Examiner—William E. Tapolcai
(74) Attorney, Agent, or Firm—Stephen Krefman; Robert O. Rice; John F. Colligan

(57) ABSTRACT

A distributed refrigeration system for a vehicle includes a vapor compression primary cooling circuit and a separate secondary cooling circuit. The secondary cooling circuit utilizes a non-toxic cooling fluid that is pumped to remote locations in the vehicle through designated supply lines. A heat exchanger acting with the primary cooling circuit cools the cooling fluid. A portable main storage compartment is fluidly connectable to the primary or secondary cooling circuits. The portable main cold storage compartment can be expandable. At the remote locations in the vehicle, docking stations permit items to be selectively cooled by the secondary cooling circuit. Both the primary and secondary cooling circuits can operate independently of the vehicle engine.

13 Claims, 22 Drawing Sheets

DISTRIBUTED REFRIGERATION SYSTEM FOR A VEHICLE

This application claims the benefit of provisional application 60/319,501, filed Aug. 27, 2002.

BACKGROUND OF INVENTION

1. Field of the Invention

The invention relates to a refrigeration system for a vehicle including a passenger motor vehicle. More particularly, the invention relates to a vapor compression refrigeration system that distributes coolant to remote locations in a vehicle for cooling specific stations. Other aspects of the invention include portable compartments including expandable compartments for docking to the refrigeration system.

2. Description of the Related Art

Refrigeration of items in a vehicle such as a passenger automobile has traditionally been accomplished by the use of portable insulated coolers. It is known to incorporate cooling units within such portable coolers, and to connect such portable coolers to an automobile air conditioning system. U.S. Pat. No. 3,850,006 describes a portable cooler having a cooling unit disposed centrally within the cooler and connectable to an automobile air conditioner by way of quick connect/disconnect couplings. U.S. Pat. No. 4,103,510 discloses a portable cooler containing a eutectic fluid and immersed heat exchange coils in its walls. The exchange coils can be coupled by way of quick connect/disconnect couplings to the automobile air conditioning system, which has lines extending from the air conditioner to the trunk of the vehicle where the cooler is removably disposed.

It is also known to provide refrigerated compartments in vehicles with portable boxes for storage and transport of items to be refrigerated, such as food or beverages. U.S. Pat. No. 5,168,718 discloses one such device with a refrigerating unit and a separate cold air compartment that is activated when a portable storage box is received in the cold air compartment. Refrigeration is provided, apart from the vehicle air conditioning system, by a vapor compression device, an adsorption device or a bimetal Peltier device, also sometimes known as a thermoelectric cooling element.

There are limitations to the foregoing systems, however. Those devices relying upon the vehicle air conditioning system for coolant require the vehicle engine to be running. Moreover, the coolant normally found in vehicle air conditioning systems is toxic. Thermoelectric devices have limited capacity and are inefficient.

SUMMARY OF INVENTION

Limitations of the prior art are overcome by the present invention of a distributed refrigeration system for a vehicle. In one aspect of the invention, a primary cooling circuit is preferably vapor compression and can be part of the vehicle air conditioning unit or an entirely separate cooling circuit. The primary cooling circuit has a heat exchanger on the evaporator side of the circuit. In one aspect of the invention a secondary cooling circuit comprising a conduit loop is used for carrying cooling fluid to locations remote from the primary cooling circuit. Preferably the cooling fluid is non-toxic.

In another aspect of the invention, docking stations are provided in remote locations in the vehicle such as, for example, a console between the driver and front passenger seats of an automobile. The console can receive a portable receptacle that is cooled by air blown through another heat exchanger in the secondary cooling circuit. The secondary cooling circuit may also include another cooling station such as a docking station adapted to receive a vessel or container having contents to be cooled. Such a vessel might be a beverage cup. Receipt of the vessel in the docking station will trigger flow of cooling fluid through the docking station or through the vessel itself.

A further aspect of the invention includes a main cold storage compartment or chest that is connectable to either the primary or secondary cooling circuits. The main cold storage compartment is expandable and collapsible so that the interior volume can be changed depending on the need for space in the compartment.

Another aspect of the invention has a cold storage compartment that can be selectively docked to one of the cooling systems in the vehicle. Also, the cold storage compartment can be docked to a refrigeration appliance remote from the vehicle, such as a home refrigerator, and is easily transportable between them.

DETAILED DESCRIPTION

Figure 1:
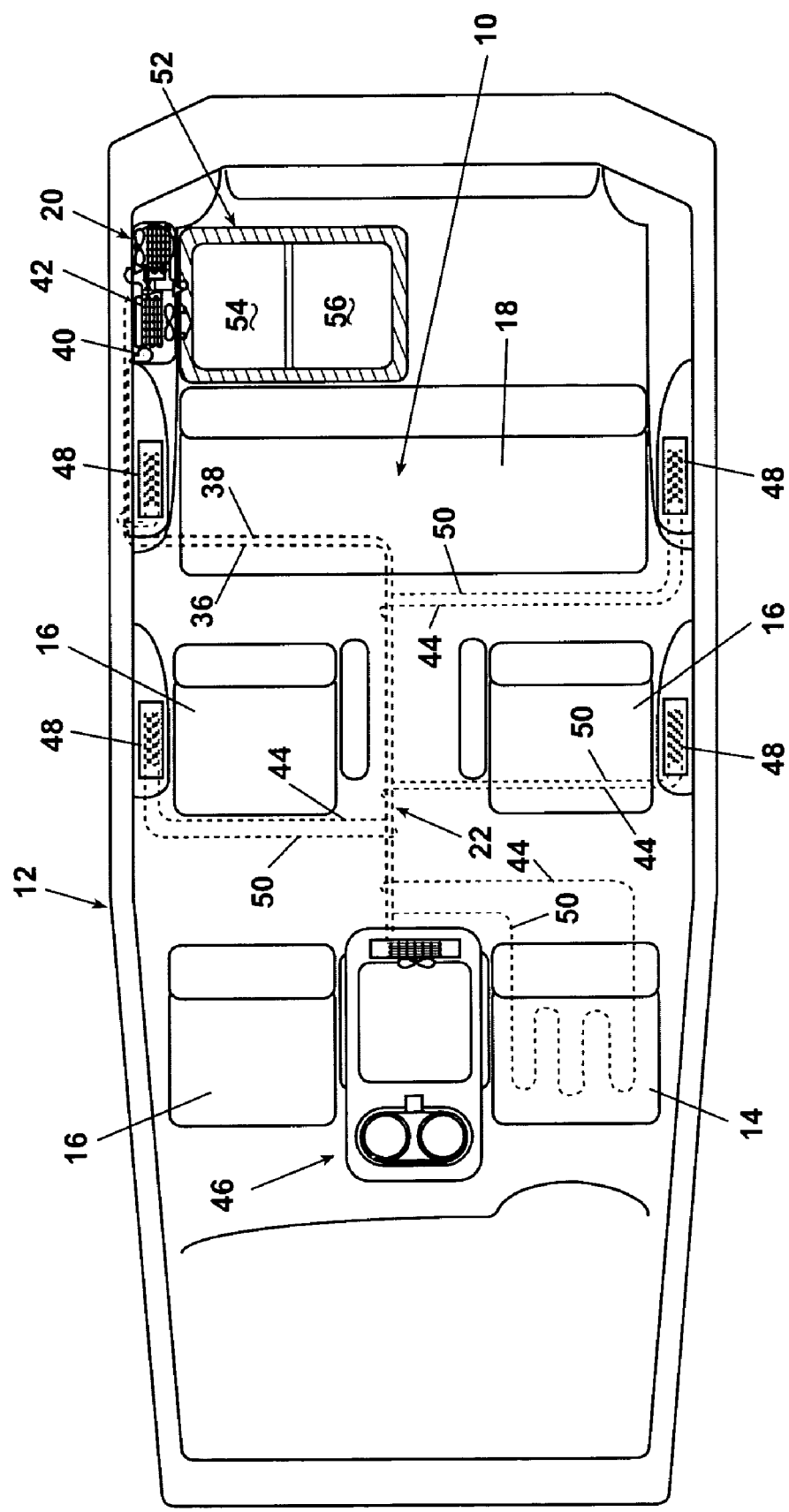
FIG. 1 is a top plan schematic view of a distributed refrigeration system in a vehicle according to the invention.

FIG. 1 generally shows a distributed refrigeration system 10 in a mobile vehicle 12 according to the invention. The mobile vehicle 12 in this embodiment is a passenger vehicle having a driver seat 14 and several passenger seats 16 including a rear seat 18. It will be understood that the invention is applicable to any type of vehicle, including land motor vehicles such as cars, trucks, mobile homes, trailers, and buses, or other vehicles such as boats and aircraft. The distributed refrigeration system 10 shown in FIGS. 1–4 comprises a primary cooling circuit 20 and a secondary cooling circuit 22. The distributed refrigeration systems of the invention have spaced apart docking stations for receiving objects to be cooled and one or more of which stations may be remotely located from the main refrigeration system. In the interest of safety, the docking station are not cooled directly by the refrigeration of any air conditioning system or primary system that the vehicle may have but by a flow of cooled air or liquid which we call a secondary refrigeration system.

Figure 2:
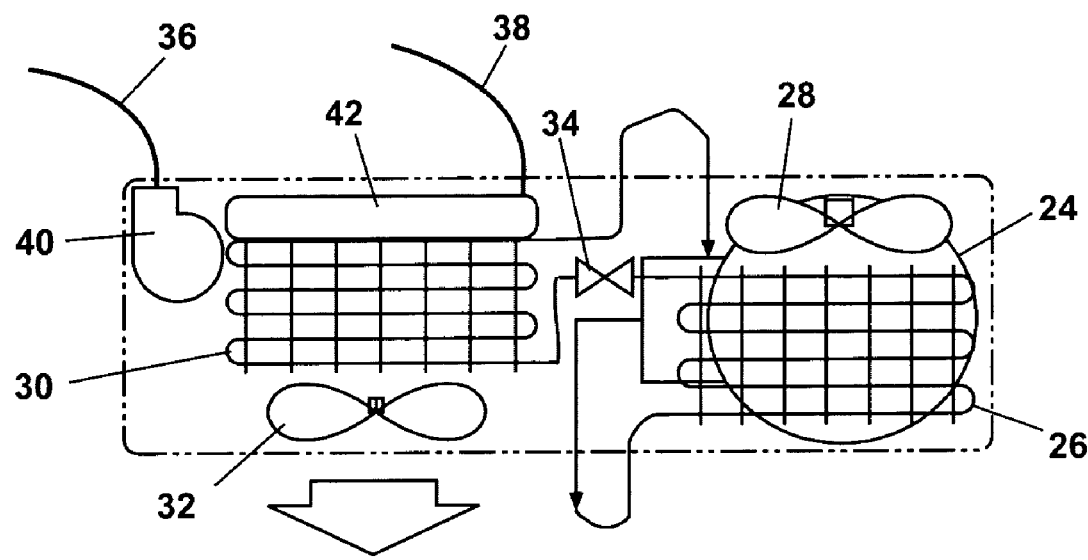
FIG. 2 shows a top plan view of the primary vapor compression circuit in the distributed refrigeration system of FIG. 1.
Figure 3:
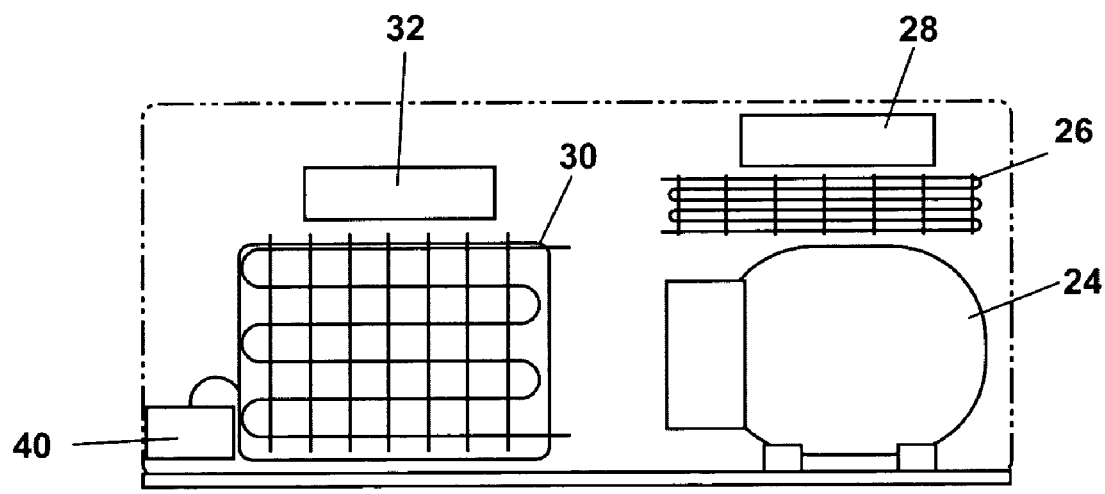
FIG. 3 is a side elevation of the primary vapor compression circuit of FIG. 2.

The primary cooling system or circuit 20 shown in FIG. 1 is illustrated in greater detail in FIGS. 2 and 3 and comprises part of the air conditioning system of the vehicle. In this embodiment, the primary cooling circuit 20 is a conventional vapor compression refrigeration circuit comprising a vehicle AC compressor 24, the AC condenser 26 (normally positioned ahead of the vehicles radiator), and condenser fan 28 on one side, and the AC evaporator 30, evaporator fan 32, and expansion device 34 on the other side. The secondary cooling system or circuit 22 comprises a main supply line 36, a main return line 38, a secondary fluid pump 40, and a heat exchanger 42. The secondary cooling circuit 22 is completely separate from and independent of the primary air conditioning cooling circuit 20. Preferably, it conveys a different and less toxic refrigerant than does a conventional vapor compression circuit such as the freon primary cooling circuit 20. A typical liquid refrigerant for the secondary cooling circuit is a water-glycol mixture or propylene glycol. The heat exchanger 42 interacts with the evaporator 30 of the primary cooling circuit whereby heat is extracted from the fluid in the secondary cooling circuit in the heat exchanger, and the cooled liquid is supplied through the supply line 36 to remote locations in the vehicle 12. The liquid is driven by the secondary fluid pump 40.

At locations in the vehicle remote from the primary air conditioning cooling circuit 20, the main supply line 36 delivers cooling liquid to one or more auxiliary supply lines 44 and to a vehicle console 46 between the driver seat 14 and the front passenger seat 16. The auxiliary supply lines 44 are connected at terminal ends thereof to one or more docking stations 48 disposed throughout the vehicle at convenient spaced apart remote locations, such as the arm rests or the seats. Auxiliary return lines 50 also extend between the docking stations 48 and the main return line 38.

A main cold storage compartment 52 is connected directly to the primary cooling circuit 20 as will be described later. Preferably, the main cold storage compartment 52 is a portable chest and thus removable from the primary cooling circuit. The main cold storage compartment 52 is divided into a freezer compartment 54 and a refrigerator compartment 56, and the airflow between them is controllable in a manner well understood to those in the art.

Different arrangements of the primary and secondary cooling circuits 20, 22 are illustrated schematically in FIGS. 4–7. The first is a tube-in-tube heat exchanger with the primary coolant being circulated through the inside tube and the secondary coolant fluid passing through the annular space between the tubes. The secondary cooling circuit fluid is pumped by the secondary fluid pump 40 to the console 46 or to the docking stations 48. The second is a fin-tube heat exchanger 60. In the second heat exchanger 60, a fan 62 blows air over the fin-tube heat exchanger 60 and delivers the cooled air either by direct vent or by insulated lines to the main cold storage compartment 52. A thermostat 64 associated with the main cold storage compartment 52 can control the evaporator fan 62, the compressor 24, and the condenser fan 28 as necessary.

Figure 5:
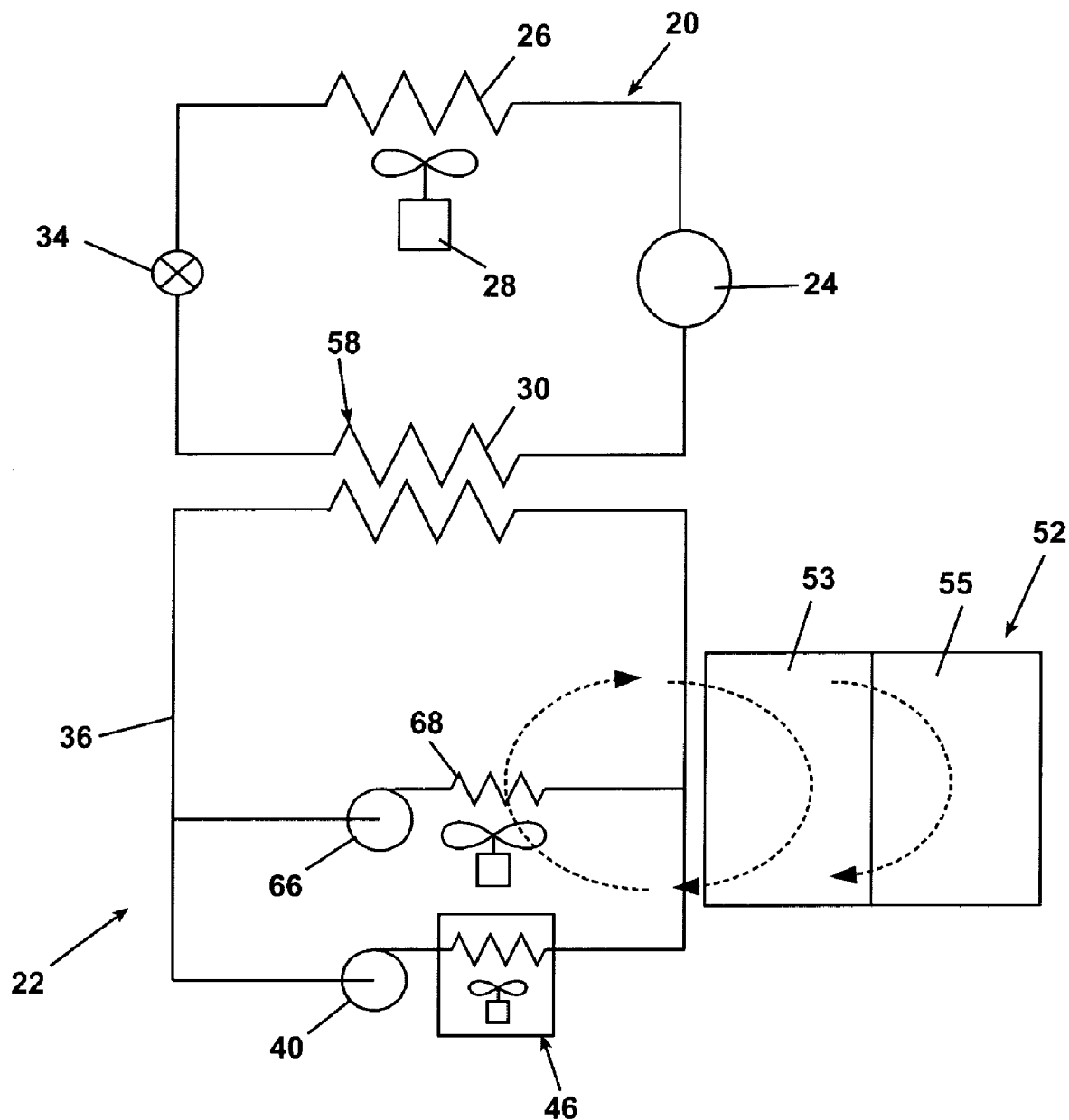
FIG. 5 is a schematic diagram of a second embodiment of the distributed refrigeration system according to the invention.

A second embodiment is shown in FIG. 5. Here, the primary cooling circuit 20 has a single evaporator 30 forming part of a single tube-in-tube heat exchanger. In the secondary cooling circuit 22, however, a second fluid pump 66 delivers cooled liquid from the main supply line 36 to a fin-tube heat exchanger 68 in parallel to the delivery of cooled fluid to the console 46 and to any docking stations (not shown in FIG. 5). The main cold storage compartment 52 receives cooled air either by direct vent or by insulated lines from the fin-tube heat exchanger 68.

Figure 6:
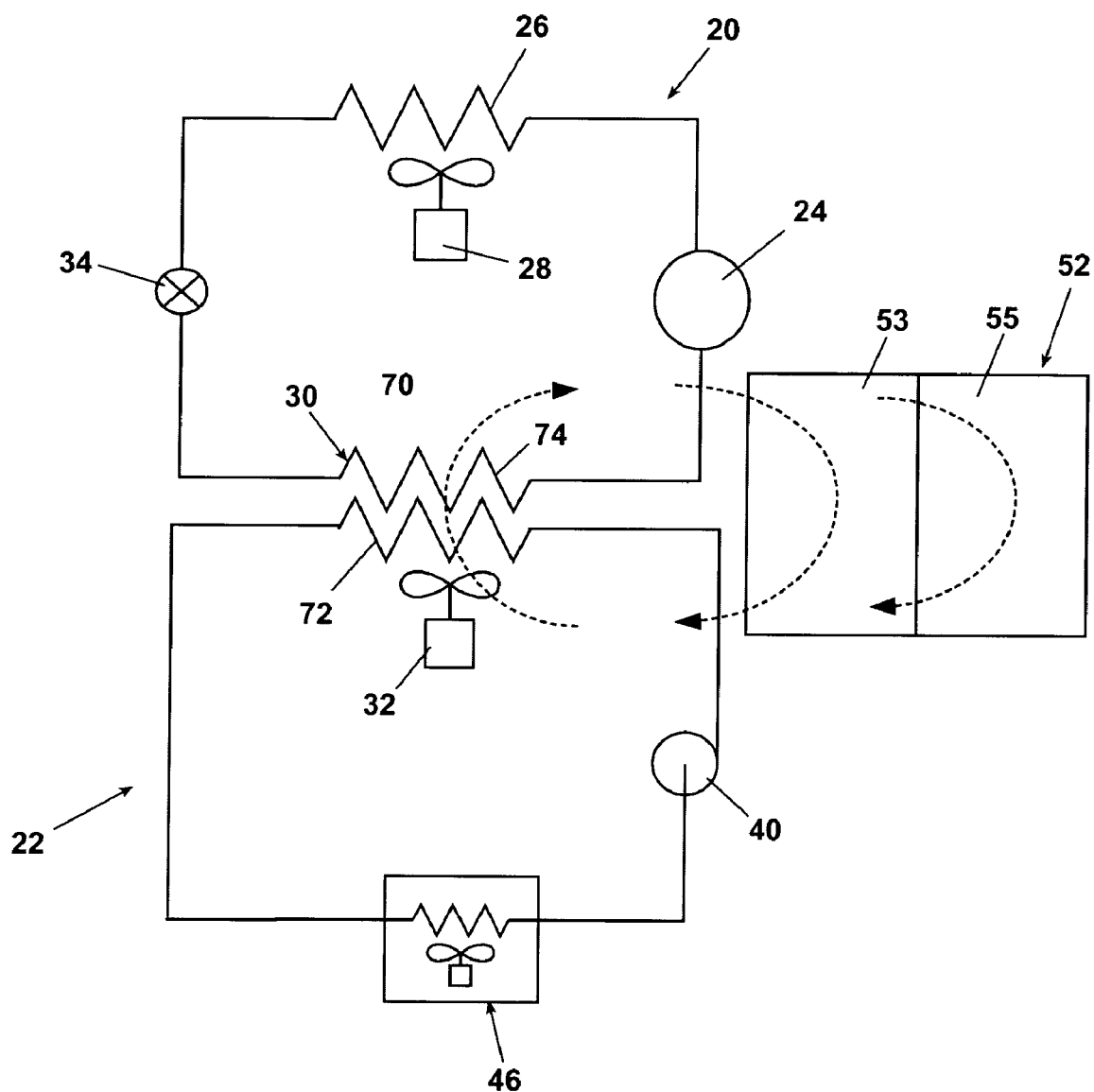
FIG. 6 is a schematic diagram of a third embodiment of the distributed refrigeration system according to the invention.

A third embodiment is shown in FIG. 6. Here, the evaporator 30 of the primary cooling circuit 20 is part of a fin-tube heat exchanger 70 with a secondary coil 72 embedded in the fins along with a primary coil 74 carrying the primary cooling circuit refrigerant. The secondary coil 72 is part of the secondary cooling circuit 22. The evaporator fan 32 blows air across the fin-tube heat exchanger 70 and delivers the cooled air either by direct vent or by insulated lines to the main cold storage compartment 52. The exchanger 70 is preferably a tube within a tube exchanger with the refrigerant from the primary circuit flowing through the inside tube.

Figure 7:
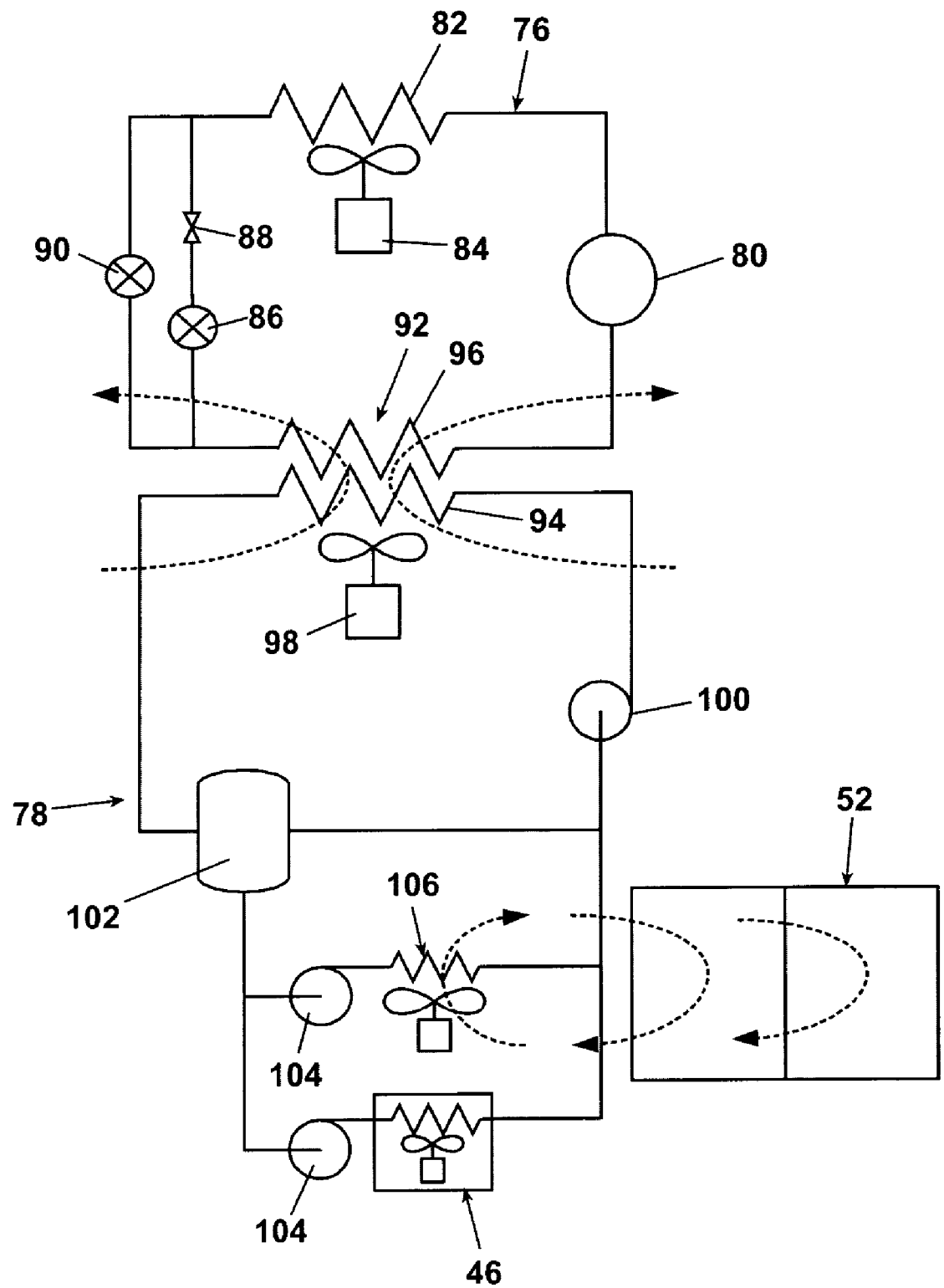
FIG. 7 is a schematic diagram of a fourth embodiment of the distributed refrigeration system according to the invention.

FIG. 7 shows a fourth embodiment where an automobile air conditioner circuit 76 is modified to work with a secondary cooling circuit 78 to provide a distributed refrigeration system according to the invention. The conditioner circuit 76 comprises a compressor 80, driven by the vehicle engine, and a condenser 82 with a condenser fan 84. A conventional expansion device 86 is separated from the condenser 82 by a solenoid valve 88. A refrigerator expansion device 90 is disposed in the circuit in parallel with the expansion device 86. Both expansion devices 86, 90 are connected to an air conditioner evaporator 92. When the solenoid valve 88 is open, nearly all the refrigerant flows through the usual air conditioner expansion device 86, and the evaporator 92 runs under usual air conditioner conditions. When the solenoid valve 88 is closed, the refrigerant flows through the more restrictive refrigerator expansion device 90 and the evaporator 92 runs under refrigeration conditions. The compressor 80 is designed to operate under both air conditioner and refrigeration conditions.

The evaporator 92 is preferably a fin-tube heat exchanger comprising a secondary coil 94 embedded in the fins along with a primary refrigerant coil 96. A fan 98 blows air across the fin-tube heat exchanger and recirculates cooled air to the automobile interior when operating in the air conditioner mode. In the refrigeration mode, the fan 98 can either recirculate air to the auto interior, or circulate outside air if no interior cooling is required. The secondary coil 94 is part of the secondary cooling circuit 78, which contains heat transfer fluid, cooled by contact with the fins of the fin-tube heat exchanger. A circulating pump 100 moves the cooled fluid through the secondary cooling circuit 78. A portion of the cooled fluid is accumulated in a reservoir tank 102 that provides thermal mass to prevent nuisance recycling between air conditioner and refrigeration modes. A thermostat (not shown) in the reservoir tank 102 controls shutoff of the solenoid valve 88.

Other fluid pumps 104 deliver cooled fluid from the reservoir tank 102 to a fin-tube heat exchanger 106 in parallel to the delivery of cooled fluid to the console 46 and to any docking stations (not shown in FIG. 7). The main cold storage compartment 52 receives cooled air either by direct vent or by insulated lines from the fin-tube heat exchanger 106.

It will be understood that power for the distributed refrigeration system according to the invention will come either from the vehicle engine, as in the embodiment of FIG. 7, or from another source. That other source can be a secondary battery dedicated to running appliances in the vehicle potentially in electrical communication with the main vehicle battery. Such a battery can feed into a DC-AC inverter, and thus permit use of common line (e.g. 110V) voltage motors and circuitry. A secondary battery can be trickle charged while the vehicle engine is running. The battery would need to be a "deep cycle" type to provide full capacity when discharging. Preferably, a low level sensor can be used to minimize or cut power output when maintaining a refrigerated space when the engine is off for an extended period. Of course, other sources of power are just as applicable. For example, power can be supplied from an onboard fuel cell running from a separate fuel source or from the main fuel tank.

Figure 4:
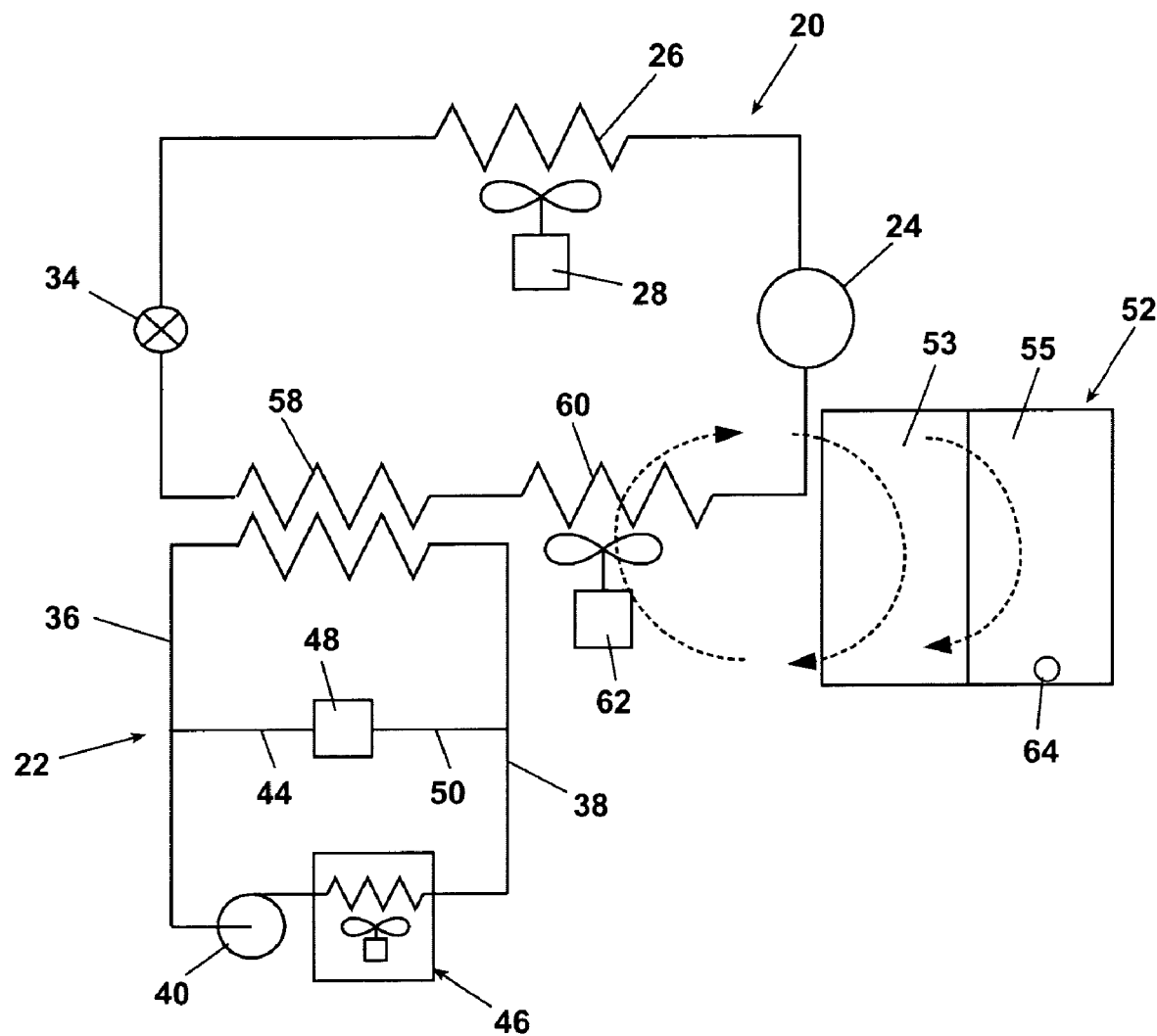
FIG. 4 is a schematic diagram of a first embodiment of the distributed refrigeration system according to the invention.
Figure 8:
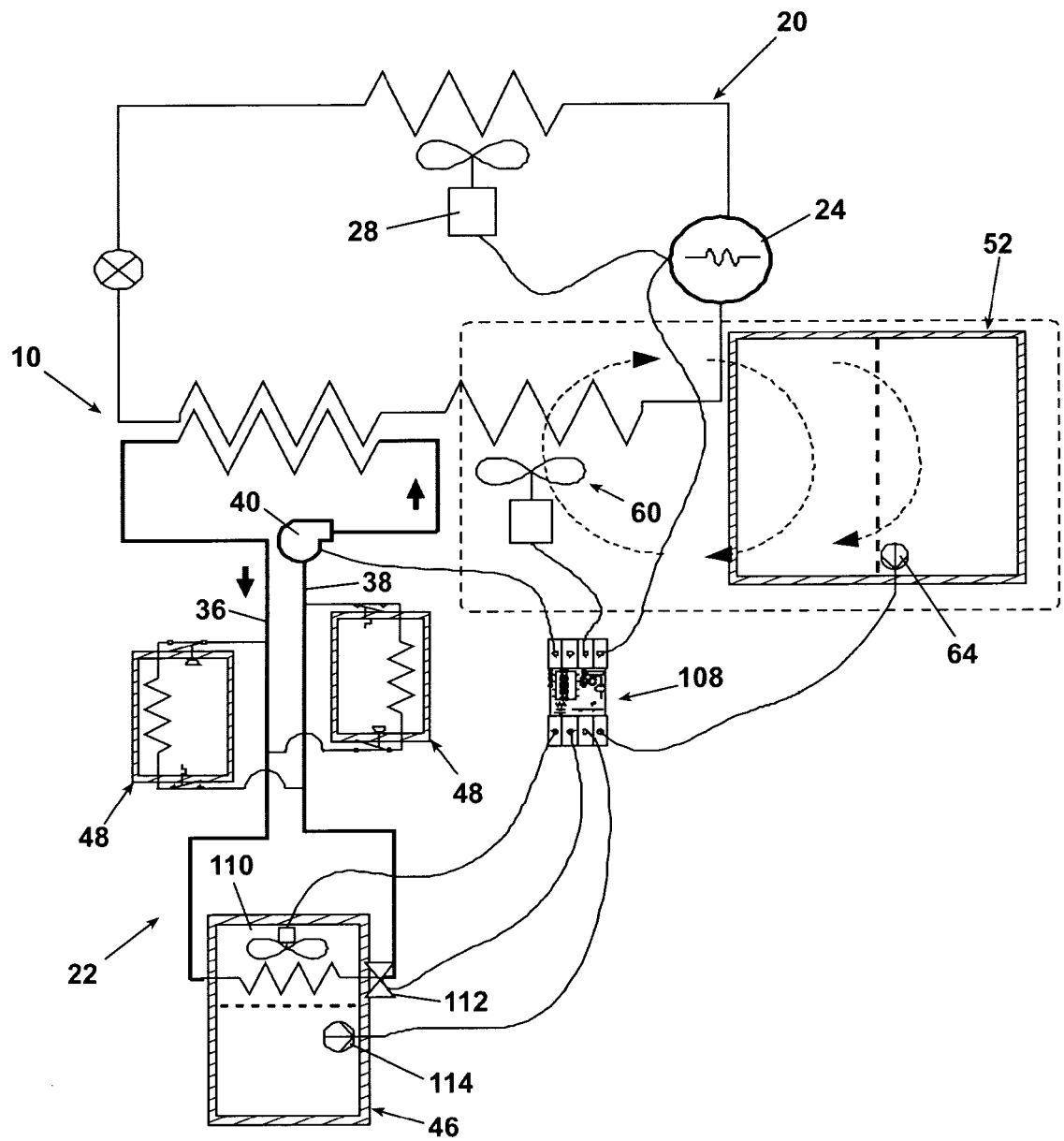
FIG. 8 is a schematic diagram similar to FIG. 4 showing an electrical circuit for controlling the components.

Various controls are available for operating a distributed refrigeration system according to the invention. An example of electrical controls and pressure controls in one embodiment of the invention is illustrated in FIG. 8 where the basic primary 20 and secondary 22 cooling circuits of FIG. 4 are shown with a main cold storage compartment 52, a center console 46, and two docking stations 48. An electronic control module 108 is wired to different elements of the distributed refrigeration system 10 to control various functions associated with it.

The electronic control module 108 is operably connected to the thermostat 64 in the main cold storage compartment 52, and also operably connected to the compressor 24, the condenser fan 28, and the fin-tube heat exchanger fan 60 to control operation of those components in response to signals received from the thermostat 64. In this embodiment, the vehicle console 46 includes a fin-tube heat exchanger, and a solenoid valve 112 to control the flow of fluid to the heat exchanger 110 from the secondary cooling circuit 22. A temperature sensor 114 in the console 46 is operably connected to the electronic module 108 to sense the temperature in the refrigeration compartment of the console. The electronic module 108 is, in turn, operably connected to the solenoid valve 112, heat exchanger 110, and secondary fluid pump 40 to control them in response to signals from the temperature sensor 114. Such a system will turn off fan 60 when the portable chest 52 is removed.

Figure 9:
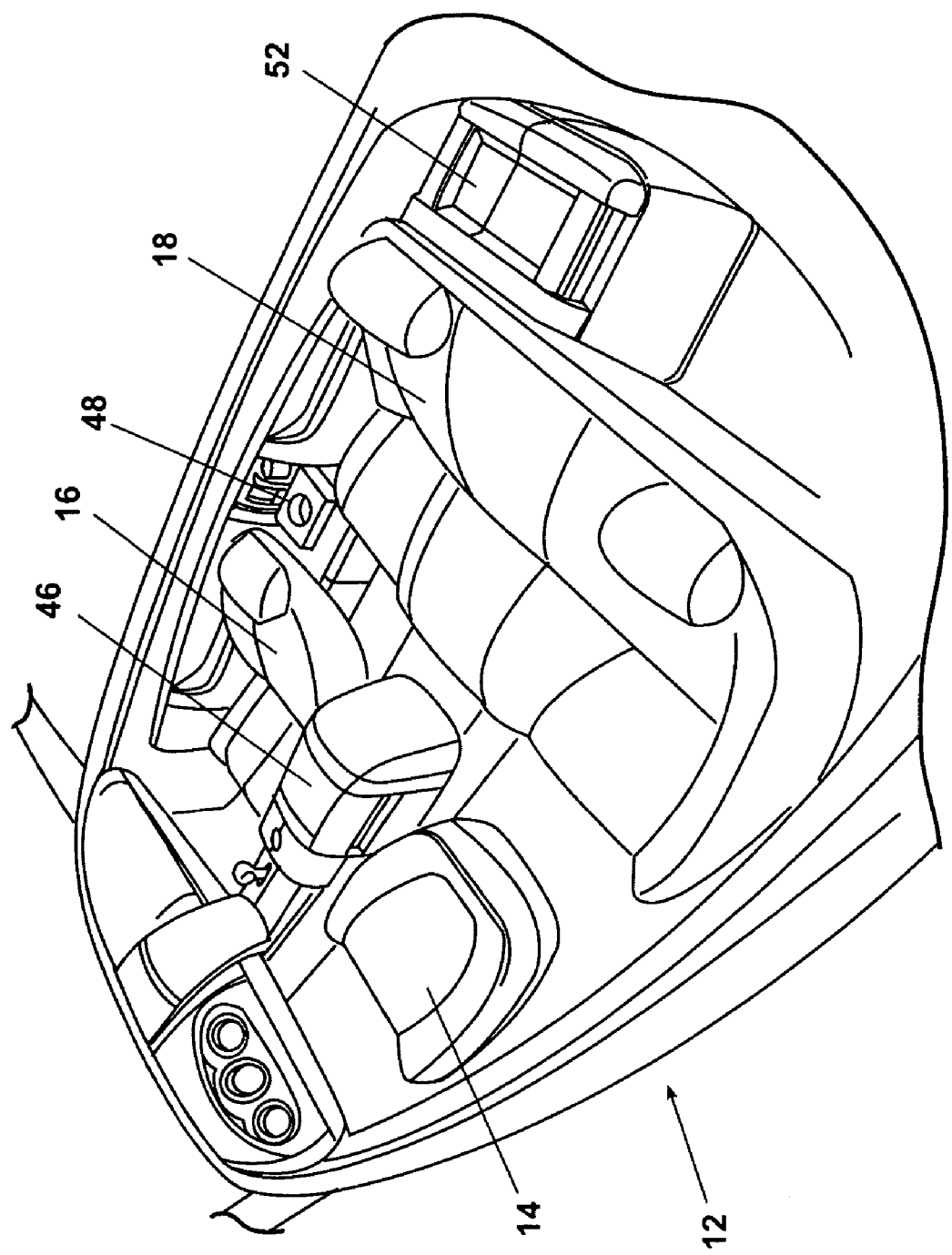
FIG. 9 is a perspective view of the interior of a vehicle with a refrigerated distribution system installed.

FIG. 9 illustrates how remotely cooled components of a distributed refrigeration system in accordance with the invention might appear in a passenger automobile. The main cold storage compartment 52 may be a cooler that is disposed immediately behind the rear seat 18 of the vehicle 12. The vehicle console 46 may be disposed between the driver seat 14 and the front passenger seat 16. A docking station 48 may be a cup holder.

Figure 10:
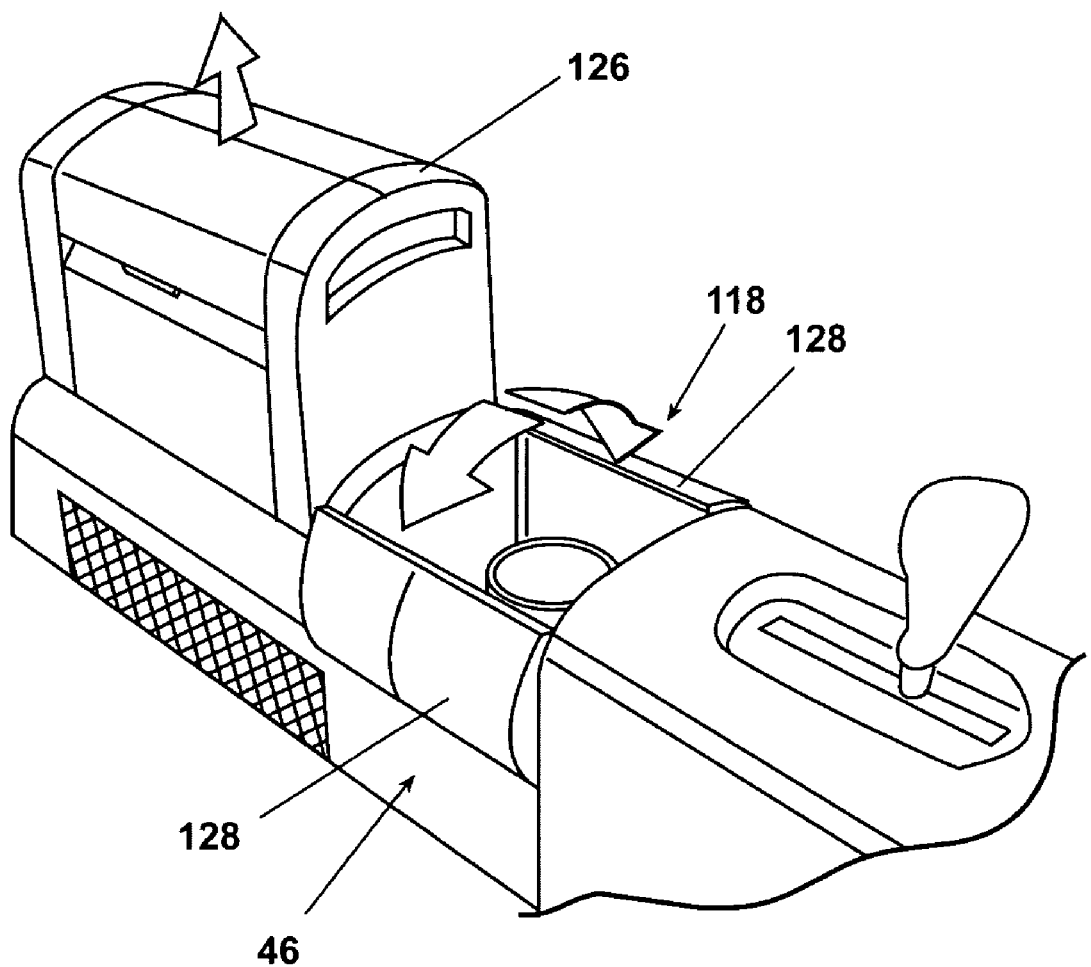
FIG. 10 is a perspective view of the console shown in the interior of a vehicle in FIG. 9.
Figure 11:
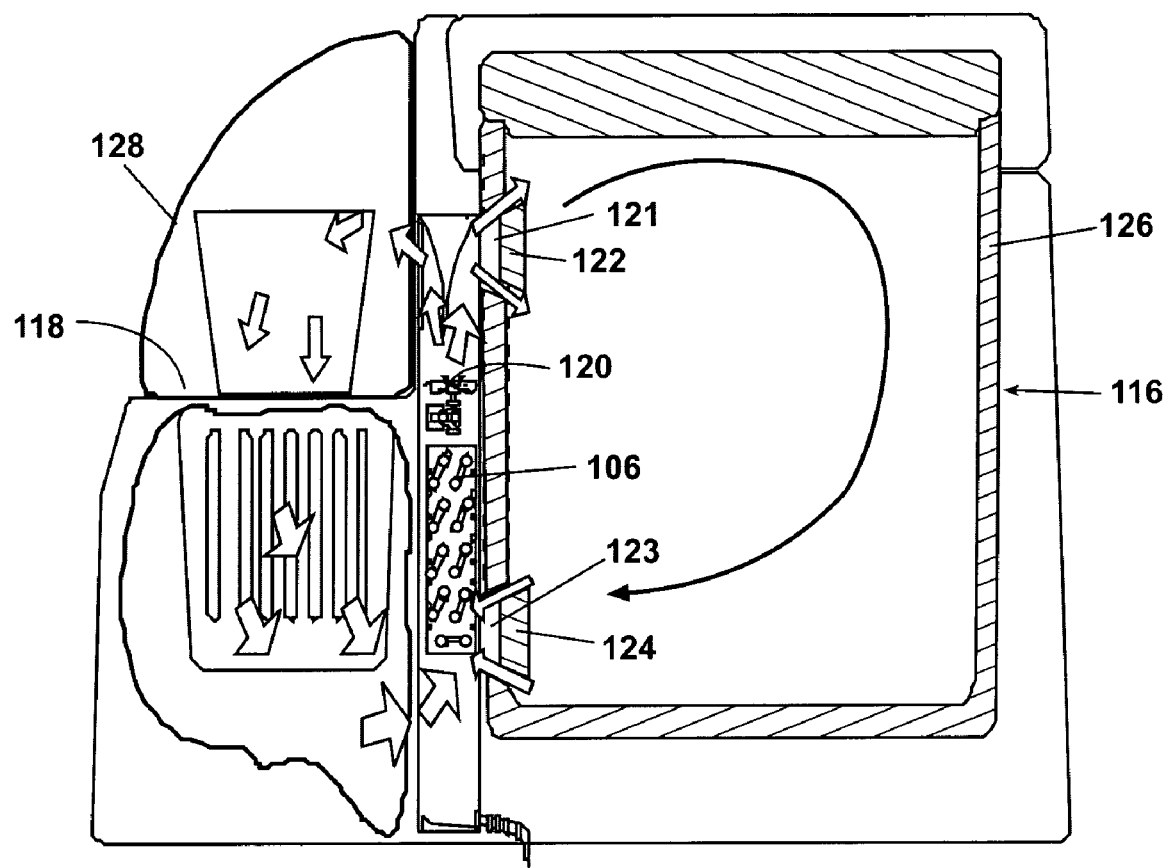
FIG. 11 is a side cross-sectional view of the console of FIG. 10.

Further detail of an embodiment of the console 46 is shown in FIGS. 10 and 11. The console 46 comprises a cooler receptacle 116 and cup holder section 118. The console 46 also has a fin-tube heat exchanger 106, preferably disposed between the cooler receptacle 116 and cup holder section 118. The fin-tube heat exchanger 106 is incorporated into the secondary cooling circuit 22 where it receives cooled fluid remotely from the primary cooling circuit 20 in accordance with the invention. A fan 120 draws cooled air from the fin-tube heat exchanger toward the cooler receptacle 116 and the cup holder section 118. An inlet opening 121 in the receptacle 116 directs air from the fan 120 into the cooler receptacle 116. An outlet opening 123 returns the air from the cooler receptacle 116. A portable cooler 126 is sized to be received in the cooler receptacle 116 and cooled by the circulated air within the receptacle. Vents 122, 124 in a wall of the cooler 126 can be designed to open automatically and be in registry with the openings 121, 123 only when the portable cooler 126 is received in the cooler receptacle 116, as shown.

Figure 12:
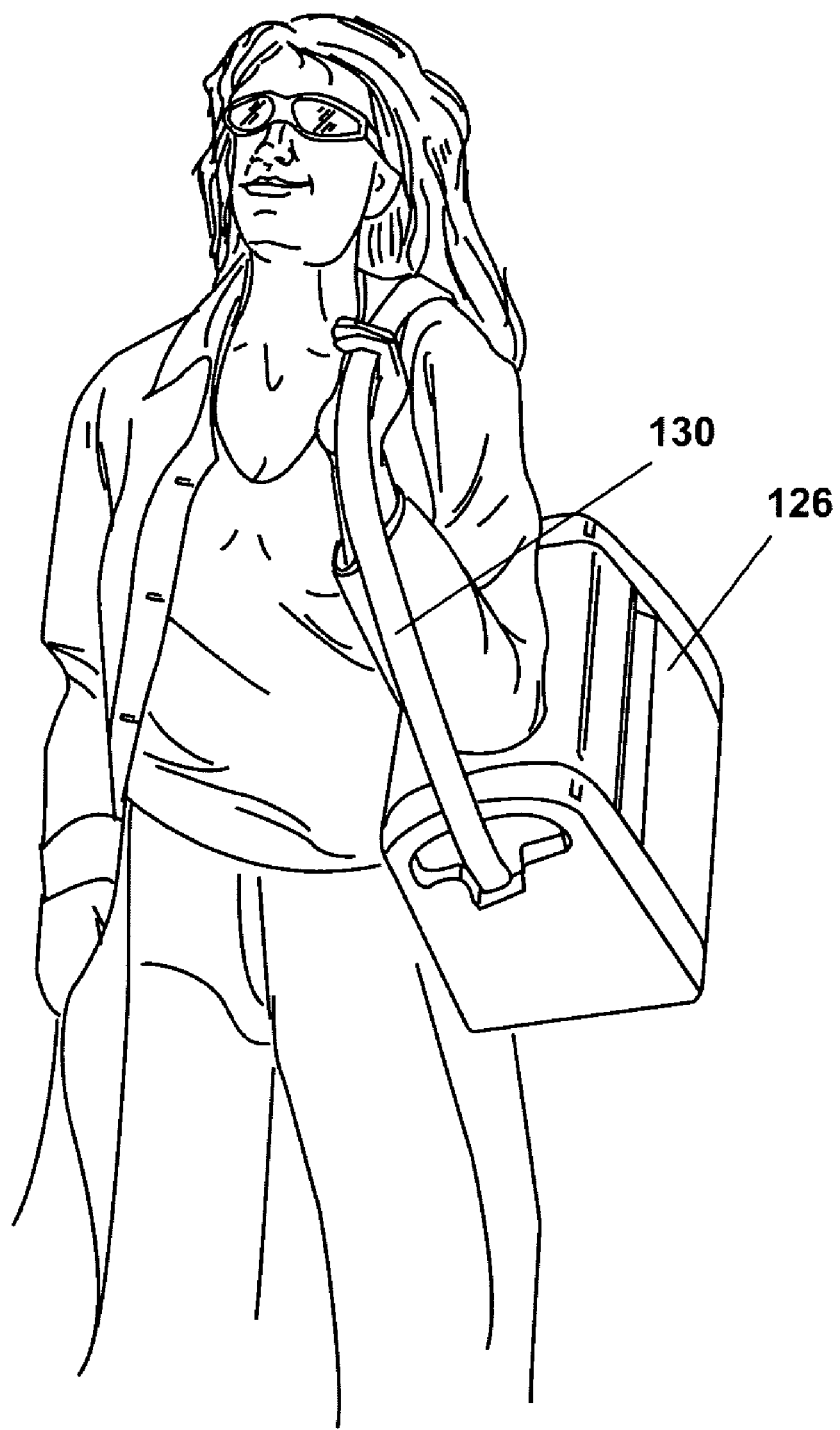
FIG. 12 shows the portability of the console device illustrated in FIGS. 10 and 11.

In a similar manner, the cup holder section 118 can be closed by retractable doors 128 that will start the flow of cooled air only when the doors are closed. Preferably, the console 46 will also have a separate system for heating the cup holder section 118 as, for example, by a resistance circuit or a thermoelectric device. A switch can be provided to either manually or automatically cut off the flow of chilled air to the cup holder section 118 when the heater is activated. In this manner, a hot beverage can be heated in the cup holder section 118, while refrigerated foods can simultaneously be kept chilled in the cooler 126. As shown in FIG. 12, the portable cooler 126 can be provided with a retractable shoulder strap 130 to facilitate mobility.

Figure 13:
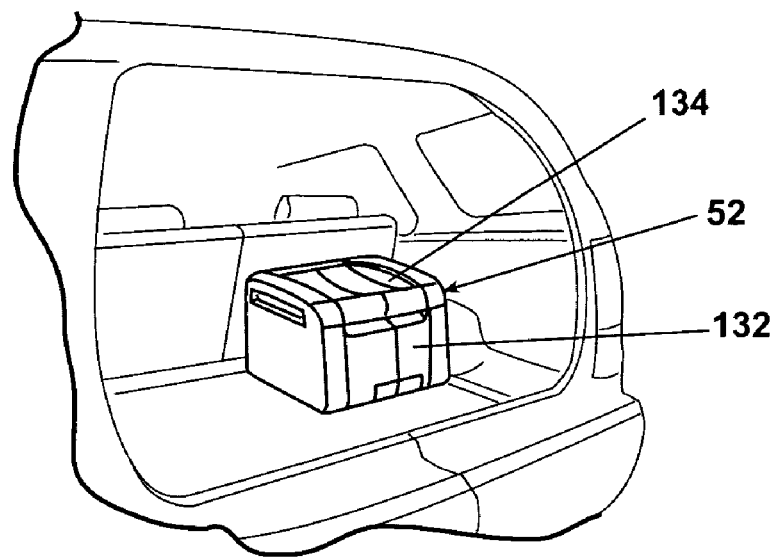
FIG. 13 is a perspective view of the interior of a vehicle with a distributed refrigeration system installed and the main refrigeration compartment of the system.
Figure 14:
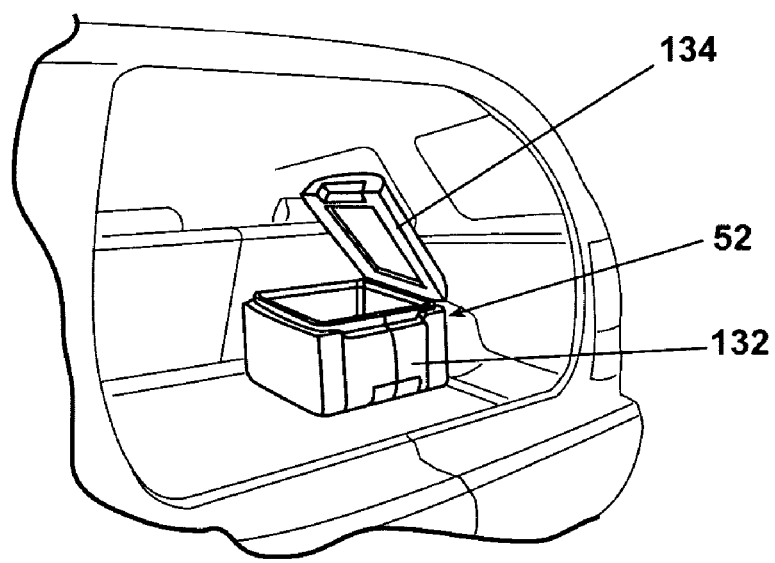
FIG. 14 is a view similar to FIG. 13 with the lid of the main refrigeration compartment opened.
Figure 15:
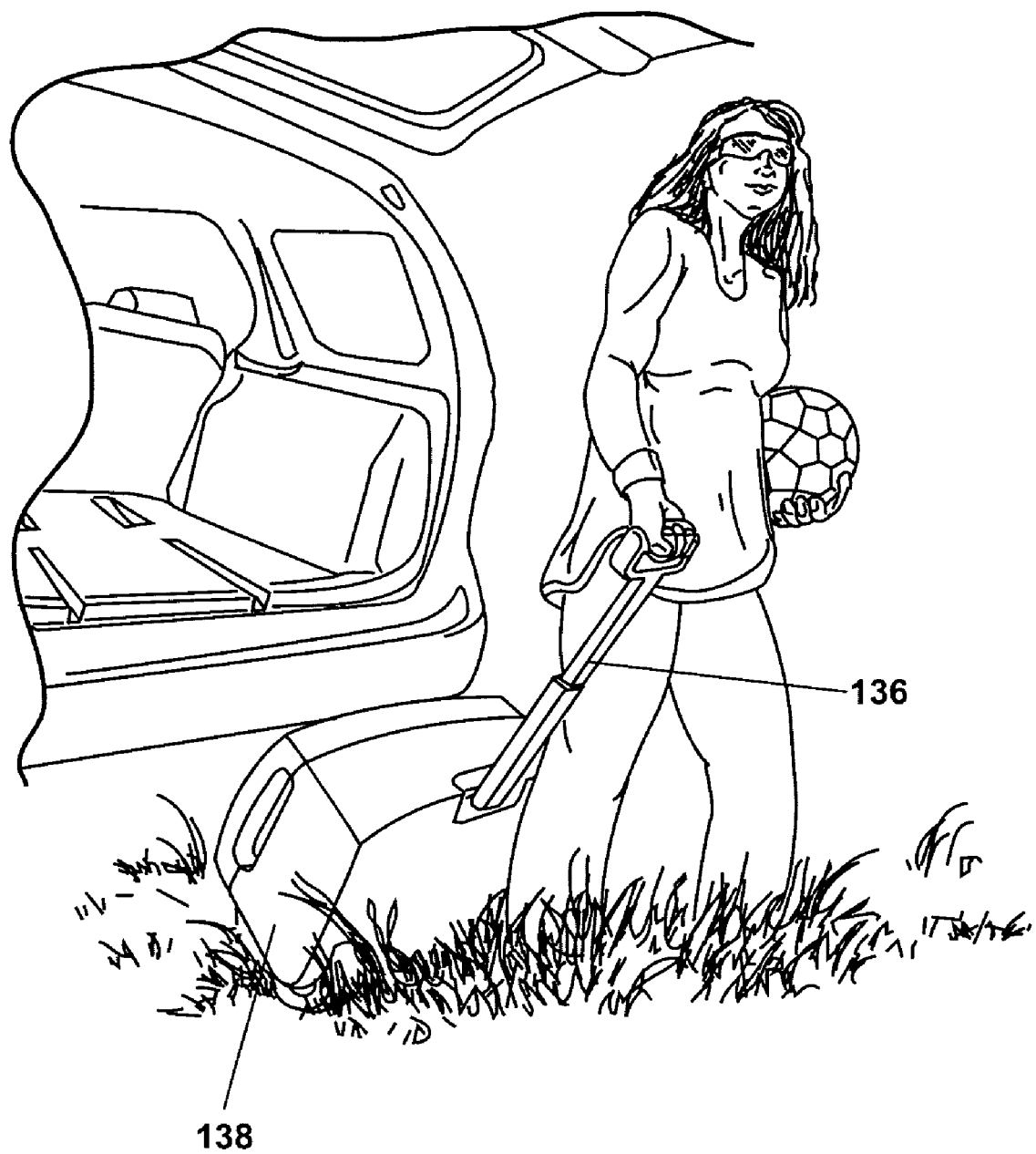
FIG. 15 shows the portability of the main refrigeration compartment of FIGS. 13 and 14.

In a similar vein, FIGS. 13–15 illustrate the possible portability of the main cold storage compartment 52. In this embodiment, the main cold storage compartment 52 would comprise a hard shell body 132 not unlike a conventional cooler. The body 132 is open at the top with a clamshell lid 134. Appropriate connections (not shown in FIGS. 13–15) are provided on a hidden side to either the primary cooling circuit 20 or to the secondary cooling circuit 22. For transport, the body 132 can be carried by handles in a conventional manner, or an extension handle 136 and recessed wheels 138 can be provided in order to wheel the main cold storage compartment 52 much like a suitcase.

Figure 16:
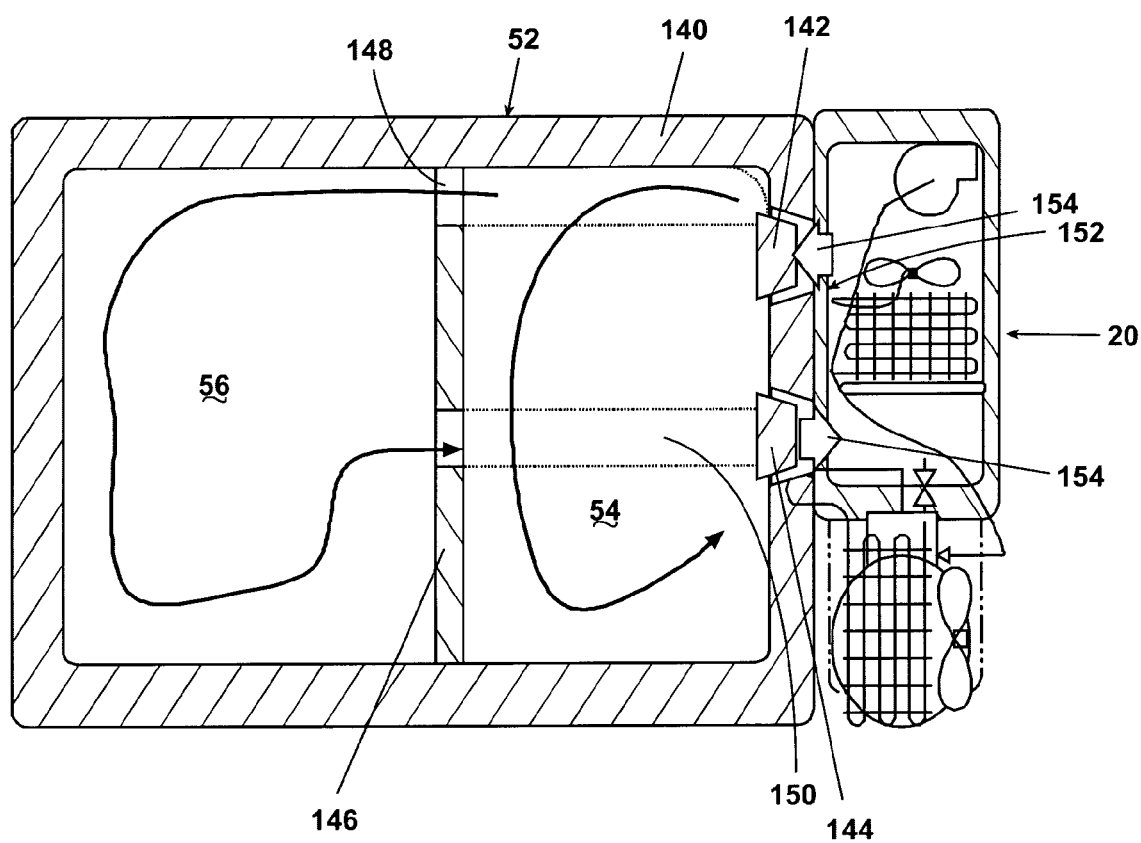
FIG. 16 is a plan cross-sectional view of the main cold storage compartment of FIGS. 13 and 14 docked to the primary cooling circuit.

Turning now to FIG. 16, the main cold storage compartment 52 illustrated in FIGS. 13 and 14 is shown in crosssectional view docked to the primary cooling circuit 20. The main cold storage compartment 52 comprises an exterior wall 140, which, on one side, has a supply vent 142 and a return air vent 144. The interior of the main cold storage compartment 52 includes the freezer compartment 54 and the refrigerator compartment 56 separated by an insulated divider panel 146. Cooling airflow is provided from the freezer compartment 54 into the refrigerator compartment 56 through a port 148. The port 148 can be provided with a manual or automatic damper to control the flow of air and the temperature in the refrigerator compartment. Return air can be provided from the refrigerator compartment 56 through ducting 150 in the exterior wall 140 or in the lid 134 (see FIG. 14). The primary cooling circuit 20 is provided with a docking port 152 having openings 154 therein disposed to be in registry with the supply air vent 142 and return air vent 144 of the main cold storage compartment 152. Preferably, the main cold storage compartment 52 or the docking port 152 can be provided with a gasket enveloping a poppet valve assembly which, when engaged, opens the supply and return air vents 142, 144 as, for example, mechanically displacing sections of the exterior wall 140.

Figure 17:
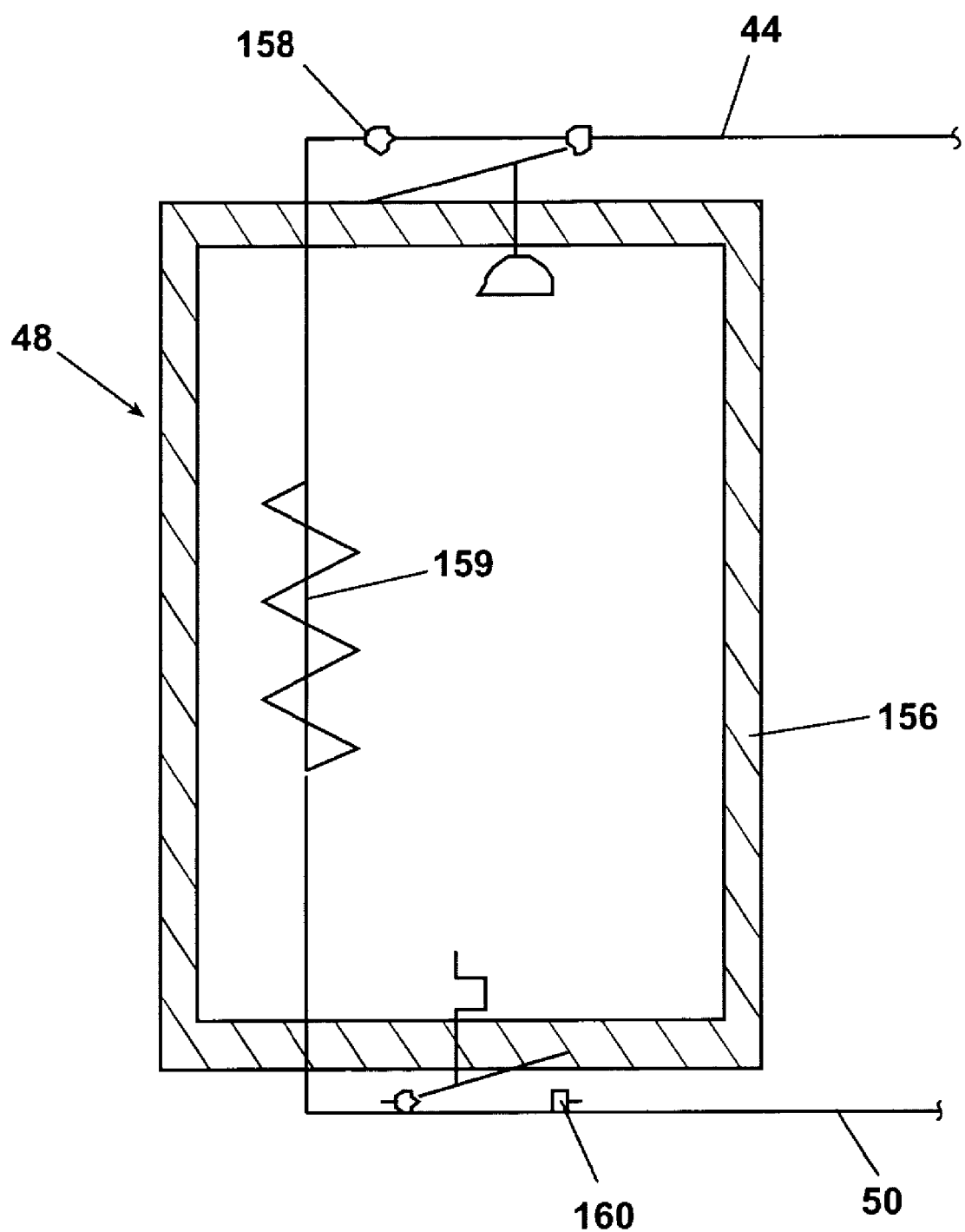
FIG. 17 is a schematic view of a remote docking station of a distributed refrigeration system according to the invention.

FIG. 17 illustrates a basic configuration of any of the remote docking stations 48. In one embodiment, a docking station 48 comprises a receptacle 156 sized and shaped to receive a predetermined vessel such a cooler or lunch box. A coil 159 in fluid communication with the auxiliary supply line 44 and the auxiliary return line 50 is embedded in the walls of the receptacle 156. A switch 158, such as a pressure switch or a pinch valve, is provided to discontinue the flow of fluid through the coil 159 when a vessel is not received in the receptacle 156. Conversely, placing a vessel within the receptacle 156 simultaneously engages the switch (or releases the pinch valve) to start the flow of cooling fluid through the coil 159. A thermostat 160 can be provided at each receptacle 156 to control the temperature of the receptacle 156 by cutting off the flow of fluid to the receptacle either independently or in conjunction with the electronic control module 108.

In an alternative embodiment, the coil 159 can be incorporated into the vessel with quick-connect/disconnect ports provided in the vessel and the receptacle whereby, upon connection of the respective ports, cooling fluid in the auxiliary supply lines is permitted to flow through the coil in the vessel and return through the auxiliary return line 50. The later embodiment might be more appropriate for an item such as a cooling blanket where the blank can be provided with external port sized and shaped to be received in the receptacle 156.

Figure 18:
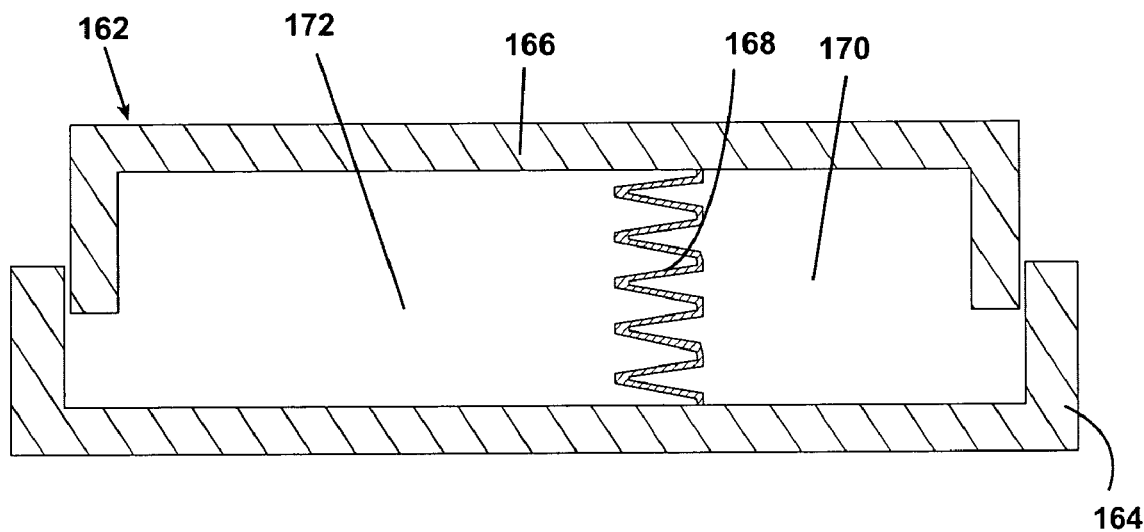
FIG. 18 is a cross sectional view of an expandable cold storage compartment according to the invention.
Figure 19:
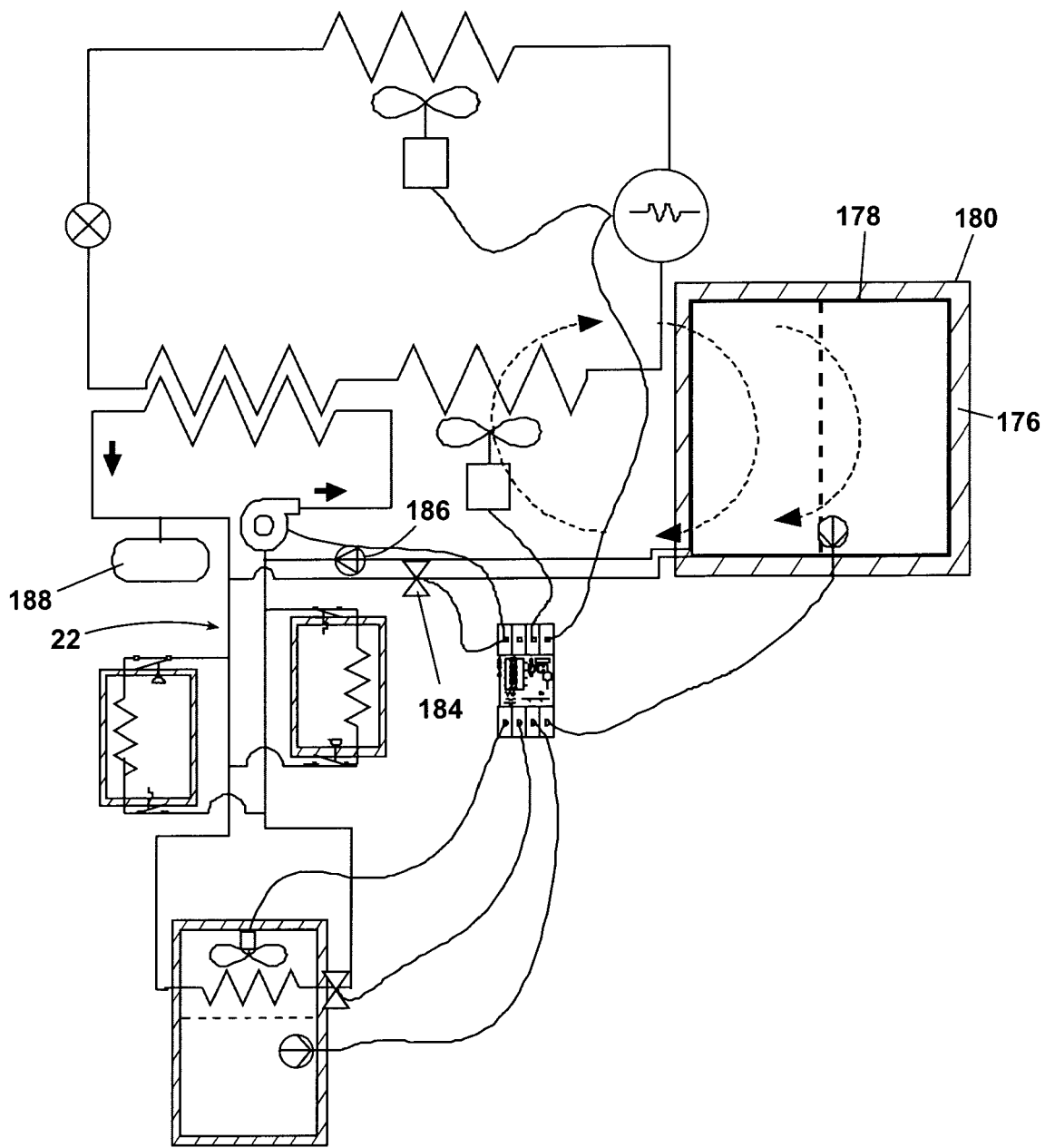
FIG. 19 is a schematic view of a distributed refrigeration system according to the invention with an inflatable cold storage compartment.
Figure 20:
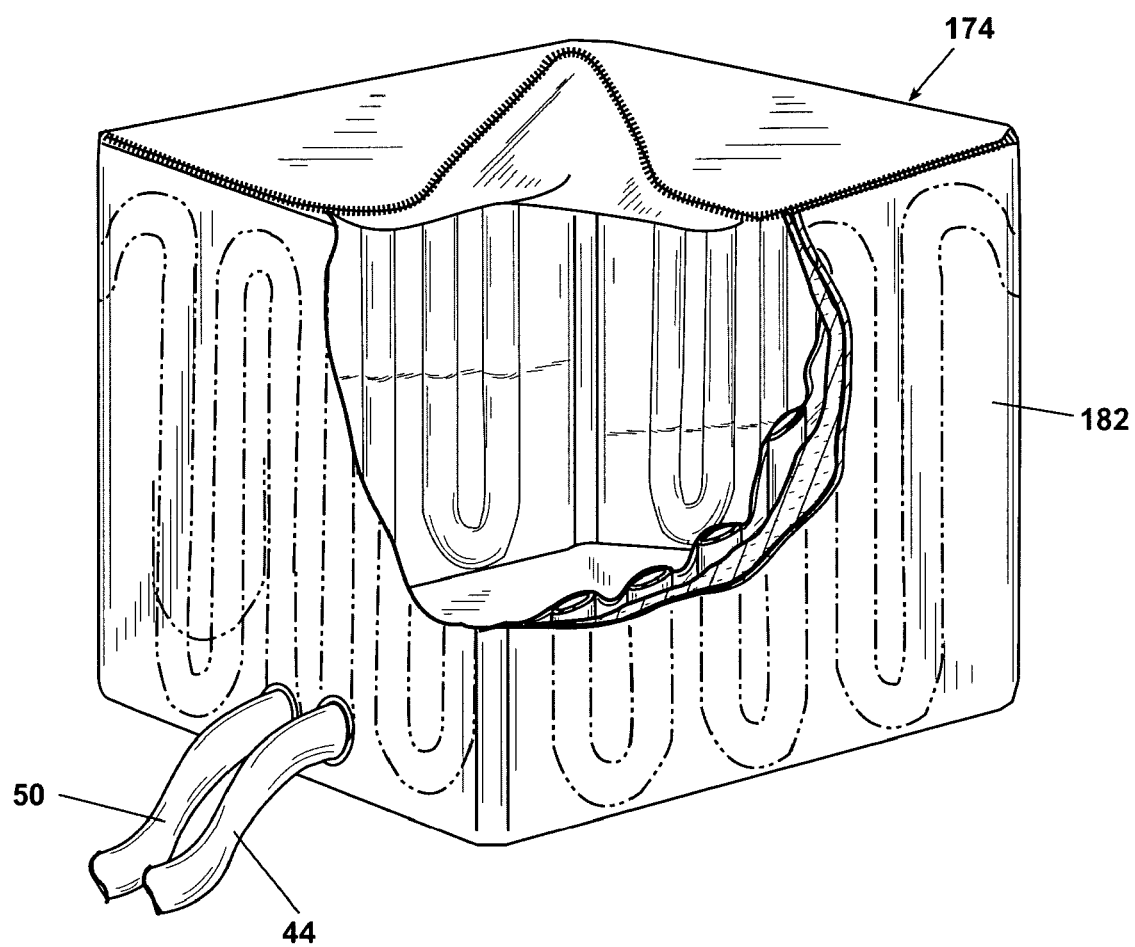
FIG. 20 is a perspective view with portions cutaway of the inflatable cold storage compartment of FIG. 19.

FIGS. 18–20 illustrate different embodiments of an expandable main cold storage compartment 162. An expandable cold storage compartment improves efficiencies where the volume of food or beverage to be chilled is less than the full volume of the cold storage compartment. In the embodiment shown in FIG. 18, the expandable cold storage compartment 162 comprises a lower shell 164 and an upper shell 166, both in facing relationship, and one nested within the other. A movable, extendable mullion 168 (such as an accordion-like wall or a slid able wall) is vertically disposed between the two shells 164, 166 to separate the internal space into a freezer compartment 170 and refrigerator compartment 172. For larger loads, the upper shell 166 is raised relative to the lower shell 164, and for smaller loads, the upper shell 166 is collapsed into the lower shell 164.

Turning now to FIGS. 19-20, another embodiment of an expandable cold storage compartment 174 comprises flexible urethane foam 176 encapsulated within a flexible polymeric inner bag 178 and a flexible outer bag 180. Flexible tubing 182 is formed into the inner bag 178. The flexible tubing 182 is connected at one end to an auxiliary supply line 44 and at another end to the auxiliary return line 50. A two-way latching solenoid 184 in one of the auxiliary lines and a check valve 186 in the other regulate flow of fluid into and out of the tubing 182.

It will be apparent that the cold storage compartment 174 is a soft-sided structure that will expand when fluid is pumped into the tubing 182. Pumping cooling fluid into the tubing 182 not only expands the structure and holds the cold storage compartment in an expanded, but it provides active insulation from heat gain because any heat provided by the contents is absorbed by the cooling fluid running through the tubing 182. The structure can be collapsed by pumping fluid out of the tubing 182, thus creating a lower than atmospheric pressure within the wall tubing and causing the tubing to collapse. Manual collapse can also be accomplished by manually forcing fluid out of the tubing 182 into the secondary cooling circuit 22. In either case a fluid overflow tank 188 is provided in the secondary cooling circuit 22 to take up excess fluid provided by evacuation from the tubing 182.

Figure 21:
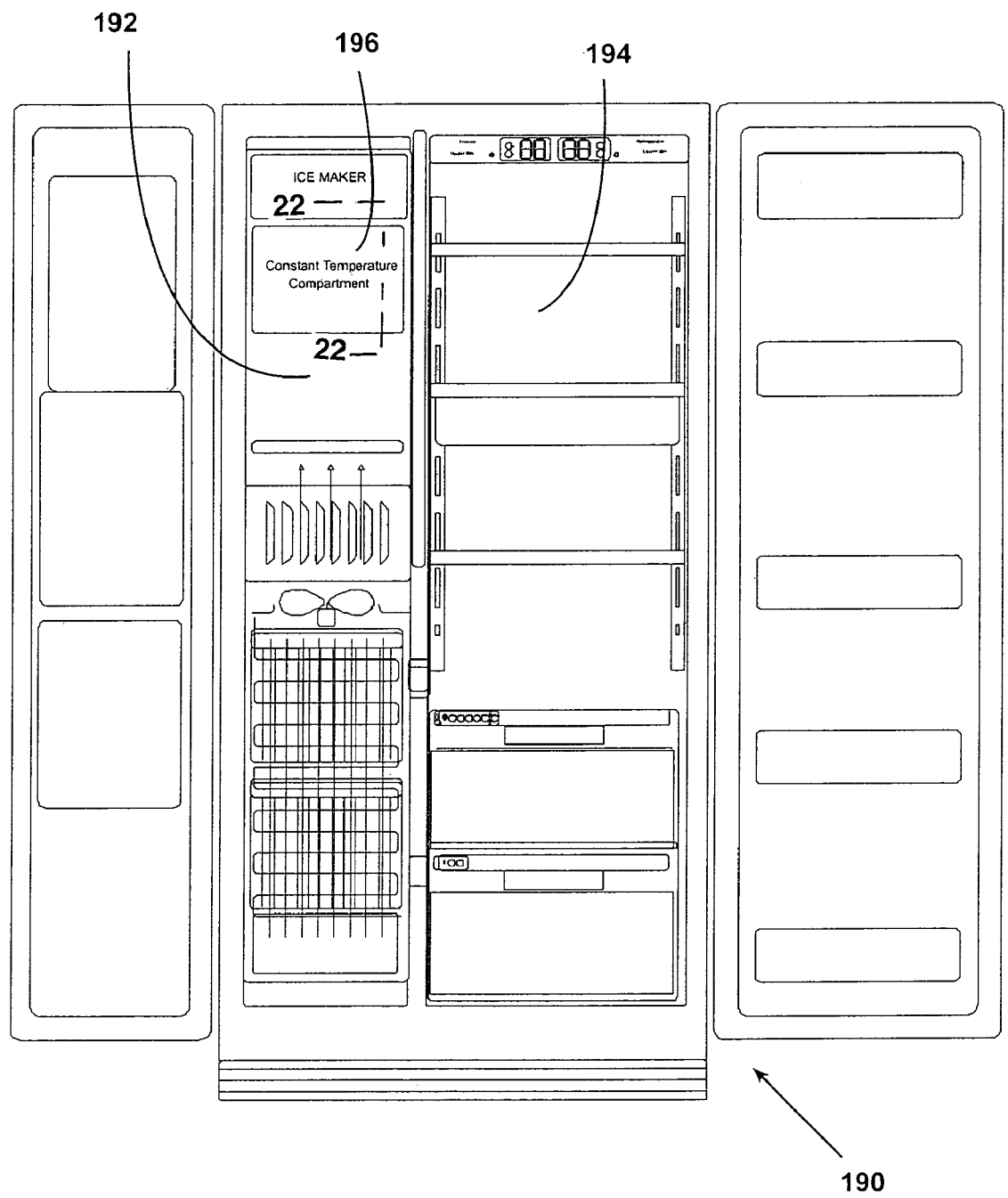
FIG. 21 is front elevational view of a home refrigerator with the doors open to show a constant temperature compartment for docking with a portable cooler from the vehicle.
Figure 22:
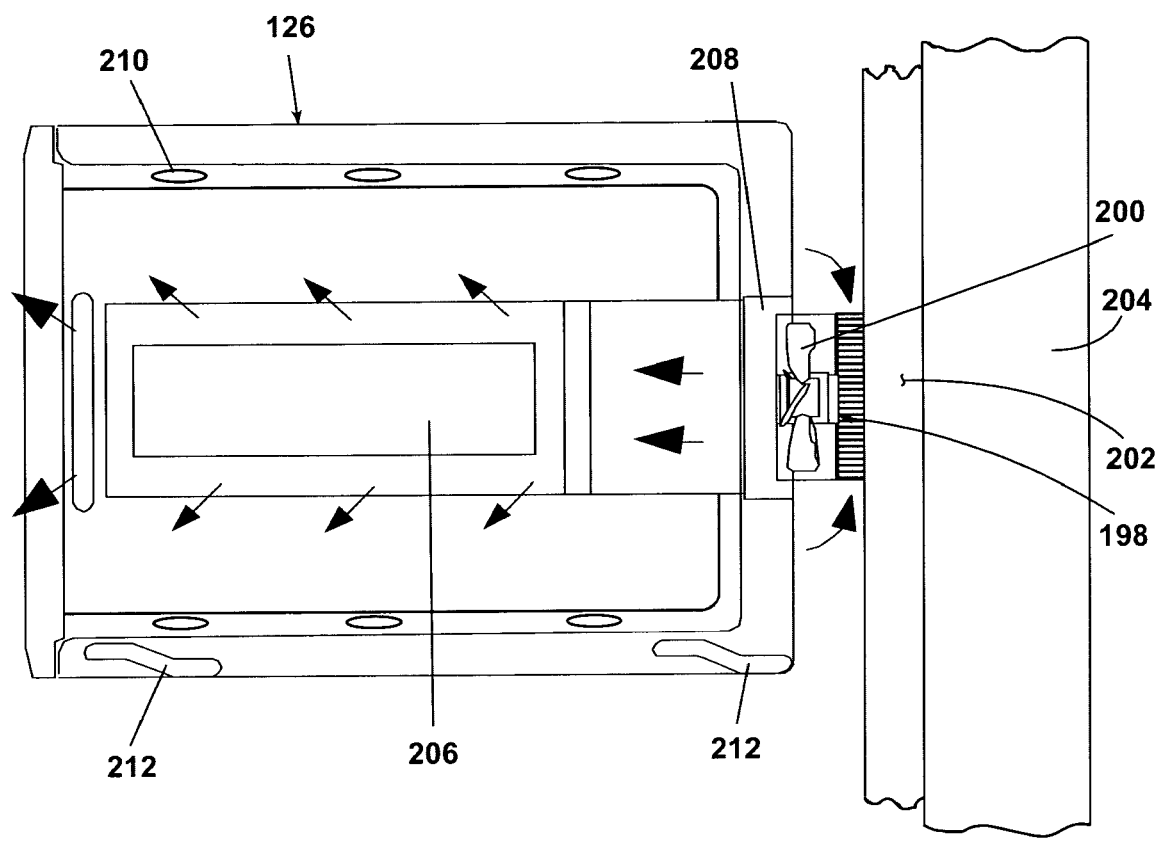
FIG. 22 is a partially cut-away cross sectional view taken along line 22—22 of FIG. 20 showing a portable cooler docked as a constant temperature compartment.

In one aspect of the invention, the portable cooler 126 is transportable between the vehicle console 46 and a conventional home refrigerator. FIGS. 21 and 22 illustrate an embodiment of a home refrigerator 190 having a freezer compartment 192 and a refrigeration compartment 194. In this embodiment, a portion of the freezer compartment 192 is dedicated to a constant temperature compartment 196 in which the cooler 126 can be docked. The host constant temperature compartment 196 has a docking port 198 having a fan 200 in fluid communication with the chilled air supply duct 202 normally in the rear wall 204 of the freezer compartment 192.

The portable cooler 126 is sized to fit within the constant temperature compartment 196, which ideally will be the same size as the cooler receptacle 116 in the vehicle console 46. At least one of the vents 122 and 124 is designed to open when the cooler 126 is docked with the docking port 198 so that chilled air from the freezer compartment air supply duct 202 can flow throughout the interior of the portable cooler 126. Alternatively, as shown in FIG. 22, the portable cooler 126 can have a phase change material 206, such as "blue ice", integrated into a wall (or the bottom) to serve as a thermal mass to damp out temperature swings as the cooler is transported or during normal refrigerator cycling. Either one of the vents 122, 124 or a plug 208 separate from the vents communicates with the space in the walls of the cooler where diffusers 210 strategically located throughout the cooler can disperse air into the interior space. When the plug 208 docks with the docking port 198, chilled air is directed to flow through the walls of the cooler 126 and diffused into the interior space. The plug 208, when docked, can also actuate an external vent (either the other vent 124 or a separate vent 210) to return air to the freezer compartment 192. Preferably, the cooler 126 has guides 212 adapted to co act with slots (not shown) in the constant temperature compartment 196 to ensure proper docking of the cooler 126.

The constant temperature compartment 196 can be adapted for a "fast freeze" option to enable the contents of the portable cooler 126 to be more quickly chilled, or a "temperature controlled" option to keep the contents of the cooler at a desired temperature apart form the temperature other than that of the freezer compartment 192. For example, a thermoelectric device can be installed in the cooler 126. A timer can be added to the fan 200, to actuate either manually or automatically. A sensor can be added to detect a defrost mode, where the fan 200 can be stopped to maintain temperature in the cooler 126. It will be understood that the constant temperature compartment 196 need not be limited to the freezer compartment 192. It can be located in the refrigeration compartment 194, or separately connected by ductwork to the refrigerator 190. It will also be understood that the portable cooler is not limited to docking in the vehicle console 46. The portable cooler may alternatively dock in the same manner as the main cold storage compartment 52. Conversely, the main cold storage compartment 52 can be transportable and configured to dock with the refrigerator 190.

Figure 23:
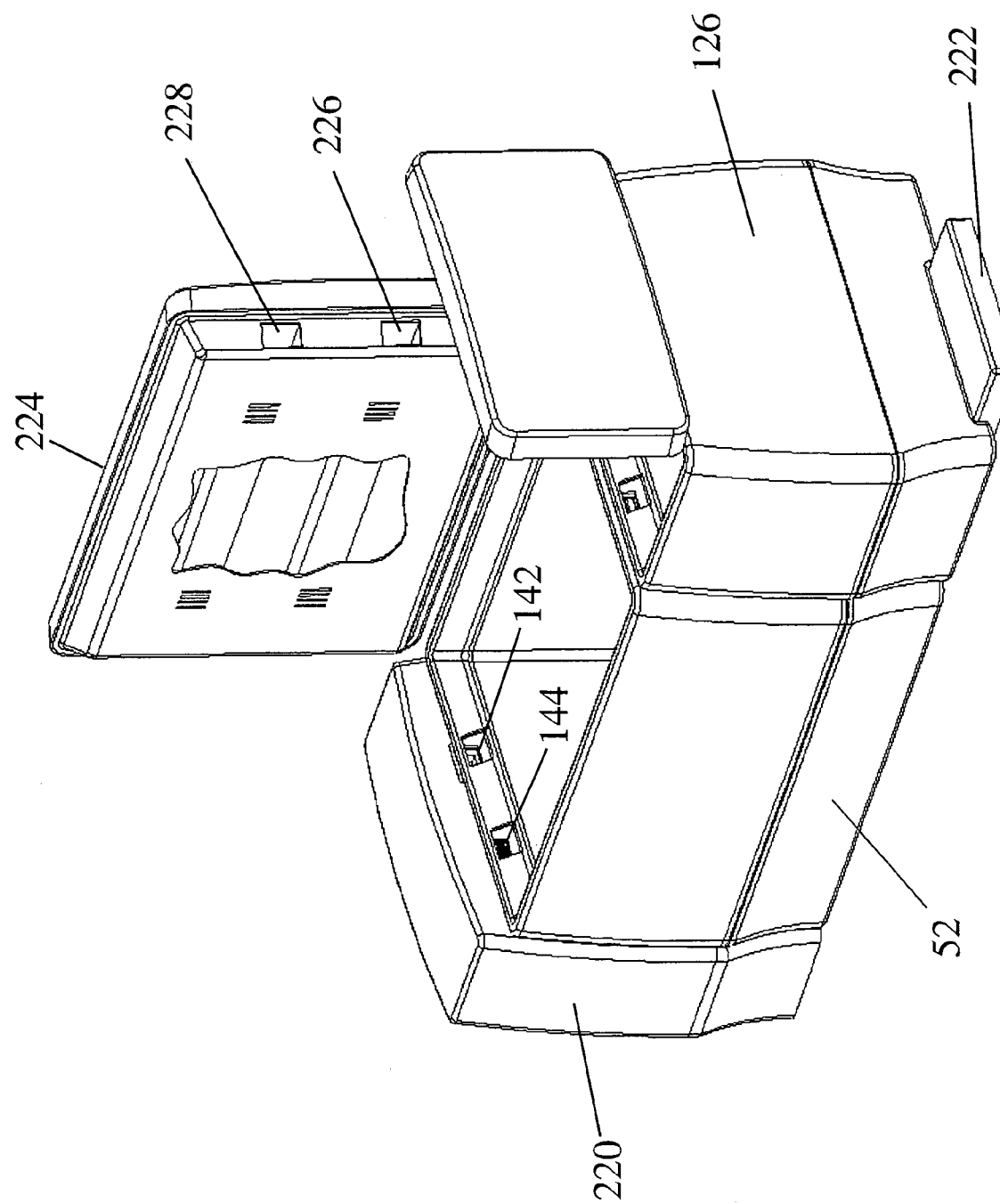
FIG. 23 is a perspective view showing the assembled relationship of the distributed refrigeration system docked with a main storage compartment and a secondary storage compartment.
Figure 24:
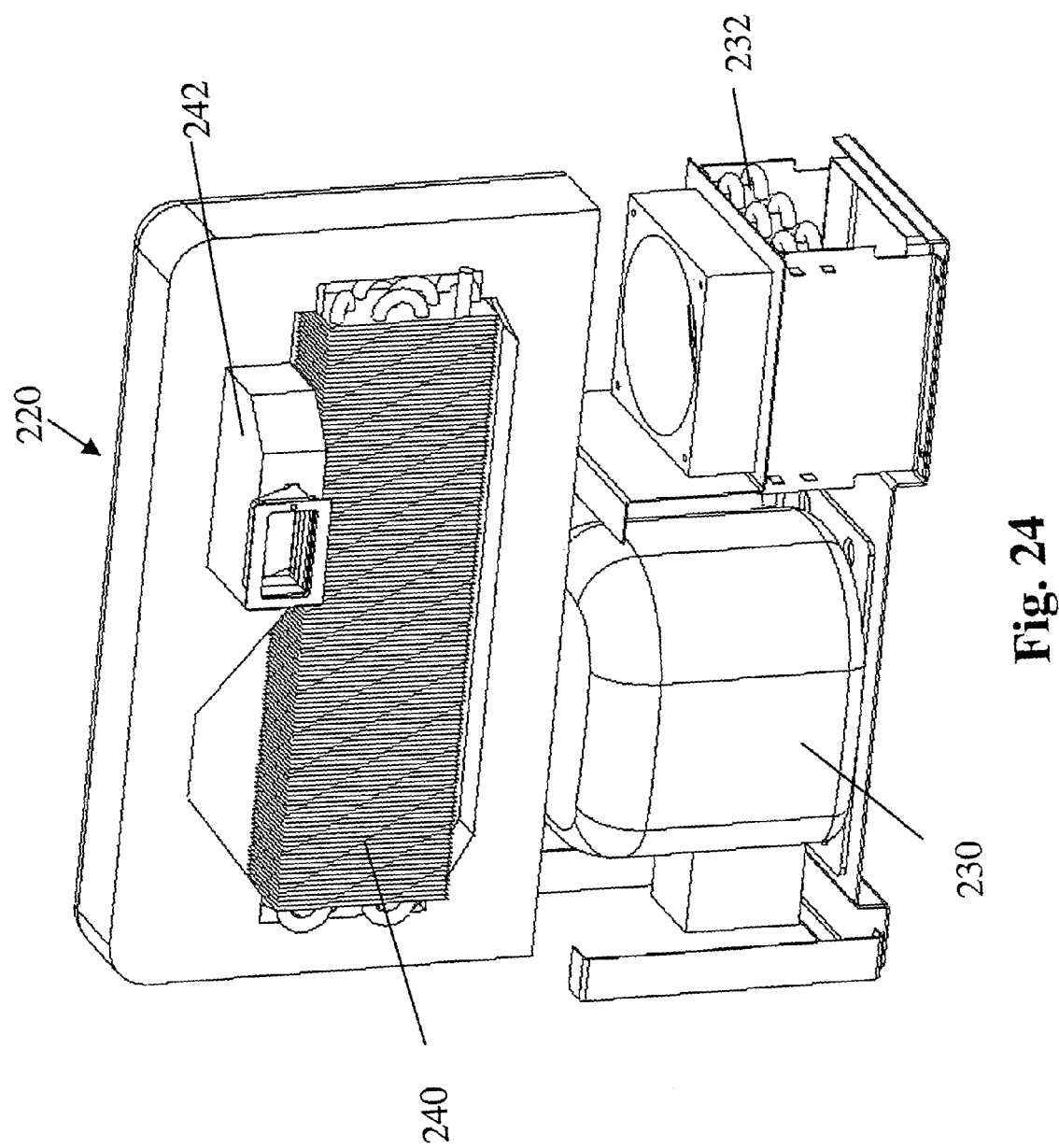
FIG. 24 Is a perspective cut-away view of the refrigeration system If FIGS. 2, 3 and 23.

A further embodiment of the invention is shown in FIG. 23 and 24. In this embodiment a self contained cooling tower 220 is provided that can be docked to the docking platform 222 to form the docking station for receiving any of the previously described portable receptacles such as the portable cooler 126, the main cold storage chest 52, or other chests designed for special purposes. In the embodiment shown in FIG. 23 the lid or cover 224 has an air inlet passageway 226 and an air return passageway 228 therein extending there through to communicate with the portable cooler 126 when it is docked to the main cold storage chest 52. The portable cooler 126 has ports therein which align with the air passageways 226 and 228. The embodiment has the obvious advantage that it can be installed anywhere without the necessity of a primary or secondary cooling system as above described. More details of the cooling tower 220 is shown in FIG. 24. The cooling tower comprises an electrically driven refrigerant compressor 230 which sends compressed refrigerant vapors to the condenser 232 through which air is blown by fan (not shown) to condense the vapors to a liquid. The liquid flows from the condenser 232 through a throttling device (not shown) which reduces the pressure and causes the liquid to vaporize. Vaporization is a cooling process and the cooled vapors pass through a fin tube heat exchanger 240. Air is blown past the fins of exchanger 240 by fan 242 and is conducted to the tower's discharge port, and the supply air vent 142 of the main cold storage chest 52. Return air flows through return air vent 144 to the cooling tower 220 for recirculation through evaporator heat exchanger 240.

Other modifications and variations are possible without departing from the scope of the invention. For example, instead of a separate docking station 48, a remote cooling station can comprise a permanent direct contact cooling coil fixed into the vehicle interior such as a cooling coil permanently affixed into the drivers seat 14. Instead of cooling provided by a cooling coil provided at remote stations, a cooling and or coupling can be provided by a cold plate interface similar to those found in thermoelectric heating and cooling devices. Moreover, at any remote station, a thermoelectric device can be employed to accelerate cool down at the remote stations, either in the vehicle console 46 or in the remote docking station 48.

The method of claim 2 wherein said last mentioned step includes providing a self contained refrigerant compressor, a condenser, and evaporator which supplies the cooled air discharged by the docking structure.

While the invention has been specifically described in connection with certain specific embodiments thereof, it is to be understood that this is by way of illustration and not of limitation, and the scope of the appended claims should be construed as broadly as the prior art will permit.

We claim:

1. Apparatus for cooling materials in a remote location comprising:
    a primary cooling circuit;
    a secondary cooling circuit;
    a primary heat exchanger thermally coupling the primary cooling circuit and the secondary cooling circuit to transfer heat between the primary cooling circuit and the secondary cooling circuit;
    a docking station remotely positioned from the primary heat exchanger and fluidly disposed in the secondary cooling circuit;
    a container removably coupled to the docking station and adapted to receive material to be cooled; and
    a secondary heat exchanger comprising a part of the docking station which transfers heat between the container and the secondary cooling circuit to cool the container.

2. The apparatus of claim 1 wherein the second heat exchanger is located in the container for the material to be cooled.

3. The apparatus of claim 1, wherein the container is a portable cooler.

4. The apparatus of claim 1, wherein the container is a cup.

5. The apparatus of claim 1, wherein the container is a refrigerator.

6. The apparatus of claim 5, wherein the refrigerator comprises a freezer compartment.

7. The apparatus of claim 1, wherein the primary cooling circuit comprises a first coolant and the secondary cooling circuit comprises a second coolant having a toxicity lower than the first coolant.

8. The apparatus of claim 7, wherein the second coolant is non-toxic.

9. The apparatus of claim 1, and further comprising at least two docking stations remotely positioned from the primary heat exchanger and from each other, and fluidly disposed in the secondary cooling circuit, and a container associated with each docking station, the at least two docking stations each comprising a secondary heat exchanger which transfers heat between the container and the secondary cooling circuit to cool the container.

10. The apparatus of claim 1, wherein the secondary heat exchanger transfers heat between a coolant in the secondary cooling circuit and air.

11. The apparatus of claim 10, wherein cooled air is circulated over the container to cool the container.

12. The apparatus of claim 1, wherein the primary heat exchanger is a tube-in-tube heat exchanger.

13. The apparatus of claim 1, wherein the primary heat exchanger is a fin-tube heat exchanger having portions of the primary cooling circuit and the secondary cooling circuit imbedded in the fins of the fin-tube heat exchanger.

* * * * *